United States Patent
Chida (10) Patent No.: US 8,345,687 B2
(45) Date of Patent: Jan. 1, 2013

(54) HIGH SECURITY BACKPLANE-BASED INTERCONNECTION SYSTEM CAPABLE OF PROCESSING A LARGE AMOUNT OF TRAFFIC IN PARALLEL

(75) Inventor: Koichi Chida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 679 days.

(21) Appl. No.: 12/230,281

(22) Filed: Aug. 27, 2008

(65) Prior Publication Data
US 2009/0059938 A1    Mar. 5, 2009

(30) Foreign Application Priority Data
Aug. 28, 2007 (JP) .................. 2007-221165

(51) Int. Cl.
  *H04L 12/28* (2006.01)
  *H04L 12/56* (2006.01)
(52) U.S. Cl. .................. 370/392; 370/401; 709/242
(58) Field of Classification Search ............ 370/401
  See application file for complete search history.

(56) References Cited

U.S. PATENT DOCUMENTS

| | | | |
|---|---|---|---|
| 6,259,699 B1 * | 7/2001 | Opalka et al. ............... | 370/398 |
| 6,693,901 B1 | 2/2004 | Byers et al. | |
| 7,088,717 B2 * | 8/2006 | Reeves et al. ............... | 370/392 |
| 7,613,170 B1 * | 11/2009 | Grabelsky et al. .......... | 370/352 |
| 2002/0159459 A1 * | 10/2002 | Nagatomo et al. .......... | 370/392 |
| 2004/0088425 A1 * | 5/2004 | Rubinstein et al. ......... | 709/230 |
| 2004/0179476 A1 * | 9/2004 | Kim et al. .................... | 370/230 |
| 2005/0152298 A1 * | 7/2005 | Thubert et al. .............. | 370/312 |
| 2005/0286553 A1 * | 12/2005 | Wetterwald et al. ........ | 370/466 |
| 2006/0114938 A1 * | 6/2006 | Kalkunte et al. ............ | 370/469 |
| 2007/0291650 A1 * | 12/2007 | Ormazabal .................. | 370/244 |

FOREIGN PATENT DOCUMENTS

| | | |
|---|---|---|
| JP | 2004-289223 A | 10/2004 |
| JP | 2007-150641 A | 6/2007 |
| WO | WO-2006/062674 A2 | 6/2006 |

OTHER PUBLICATIONS

Kato et al., "High-speed Address Hiding Function for Next Generation Networks", Oki Technical Review, Apr. 2007/Issue 210, vol. 74, No. 2, pp. 28-31.

* cited by examiner

*Primary Examiner* — Andrew Chriss
(74) *Attorney, Agent, or Firm* — Rabin & Berdo, P.C.

(57) ABSTRACT

An inter-network connection system is provided with a plurality of interface boards capable of processing traffic in a lower layer, an upper layer processing board capable of processing traffic in an upper layer, and an inter-board connection board capable of intervening in information transfer between the interface board and the upper layer processing board. The interface board has its input/output ports paired as port groups. When traffic is input through one input/output port of a port group, the traffic is output through the other input/output port of this port group. Only when the traffic is to be processed in the upper layer, the traffic is transferred from the interface board to the upper layer processing board. The inter-network connection system allows the amount of traffic processed in parallel to be increased with a high security configuration.

10 Claims, 4 Drawing Sheets

HIGH SECURITY BACKPLANE-BASED INTERCONNECTION SYSTEM CAPABLE OF PROCESSING A LARGE AMOUNT OF TRAFFIC IN PARALLEL

BACKGROUND OF THE INVENTION

1. Field of the Invention

The present invention relates generally to an interconnection system, and in particular to an inter-network connection system which can be used to provide connections between a plurality of telecommunications carrier networks. The present invention also relates to an interface board and a traffic control method for use in such an interconnection system.

2. Description of the Background Art

U.S. Pat. No. 6,693,901 to Byers et al., discloses a backplane-based interconnection system. The backplane-based interconnection system disclosed includes a backplane with a plurality of traces coupled to slots for receiving circuit packs. The backplane traces are configured to form point-to-point connections from one slot of the backplane to every other slot of the backplane. A hub circuit is provided on each circuit pack for coupling the circuit pack to the point-to-point connections on the backplane. The circuit packs communicate by direct connections over the point-to-point connections or indirectly by sending traffic through the point-to-point connections and hub circuits.

However, in the case of Byers et al., the point-to-point connections are always provided on the backplane such that there is a problem that the capacity of processing the traffic of the backplane becomes a bottleneck to limit the traffic capacity in regard to parallel processing.

In an application where traffic streams through a plurality of ports cross each other in a common interfacing section such as a backplane, security vulnerability often becomes actualized.

Because of this, there is desired a high security inter-network connection system attaining the increased capacity of processing traffic in parallel.

SUMMARY OF THE INVENTION

It is therefore an object of the present invention to provide an inter-network connection system and a traffic processing method in which the amount of traffic processed in parallel can be increased with a higher-security configuration.

In accordance with the present invention, an inter-network connection system to be located between an own communications network to which the system belongs and another communications network for connecting both communications networks to each other comprises: an interface board having a plurality of input/output ports for receiving/outputting traffic for processing the traffic in a lower layer; an upper layer processing board for processing traffic in an upper layer; and an inter-board connection board intervening in information transfer between the interface board and the upper layer processing board, the interface board comprising: a port group information setter having information on a port group formed by ones of the plurality of input/output ports which are paired; a session information storage for storing information about a session which is established; a lower layer processor for processing the traffic in the lower layer; a route setter for setting a route of traffic so that, when the traffic is input through one of the input/output ports of the port group, the traffic is output through the other of the input/output ports of the port group; and a process determiner for referencing session identification information of the traffic input and the session information stored in the session information storage to determine whether or not the traffic input is to be processed in the upper layer so as to cause, when the traffic is to be processed in the upper layer, the traffic to be transferred to the upper layer processing board.

In accordance with an aspect of the present invention, a method of processing traffic in an inter-network connection system located between an own communications network to which the system belongs and another communications network for connecting both communications networks to each other, the inter-network connection system comprising an interface board having a plurality of input/output ports for receiving/outputting traffic for processing the traffic in a lower layer, an upper layer processing board for processing traffic in an upper layer, and an inter-board connection board intervening in information transfer between the interface board and the upper layer processing board, the interface board further comprising a port group information setter, a session information storage, a lower layer processor, a route setter and process determiner, comprises the steps of: setting in the port group information setter information on a port group formed by ones of the plurality of input/output ports which are paired; storing information about a session which is established in the session information storage; setting a route of traffic by the route setter so that, when the traffic is input through one of the input/output ports of the port group, the traffic is output through the other of the input/output ports of the port group; and referencing by the process determiner session identification information of the traffic input and the session information stored in the session information storage to determine whether or not the traffic input is to be processed in the upper layer so as to cause, when the traffic is to be processed in the upper layer, the traffic to be transferred to the upper layer processing board for processing the traffic in the upper layer and, when the traffic may not be processed in the upper layer, the traffic to be transferred to the lower layer processor for processing the traffic in the lower layer.

In accordance with the present invention, the inter-network connection system thus structured and a method therefor allow the amount of traffic processed in parallel to be increased with a high security configuration.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

In what follows, with reference to the accompanying drawings, an interconnection system in accordance with an illustrative embodiment of the present invention will be described in detail. The interconnection system of the present embodiment is directed to an inter-network connection system between telecommunications carriers.

Figure 2:
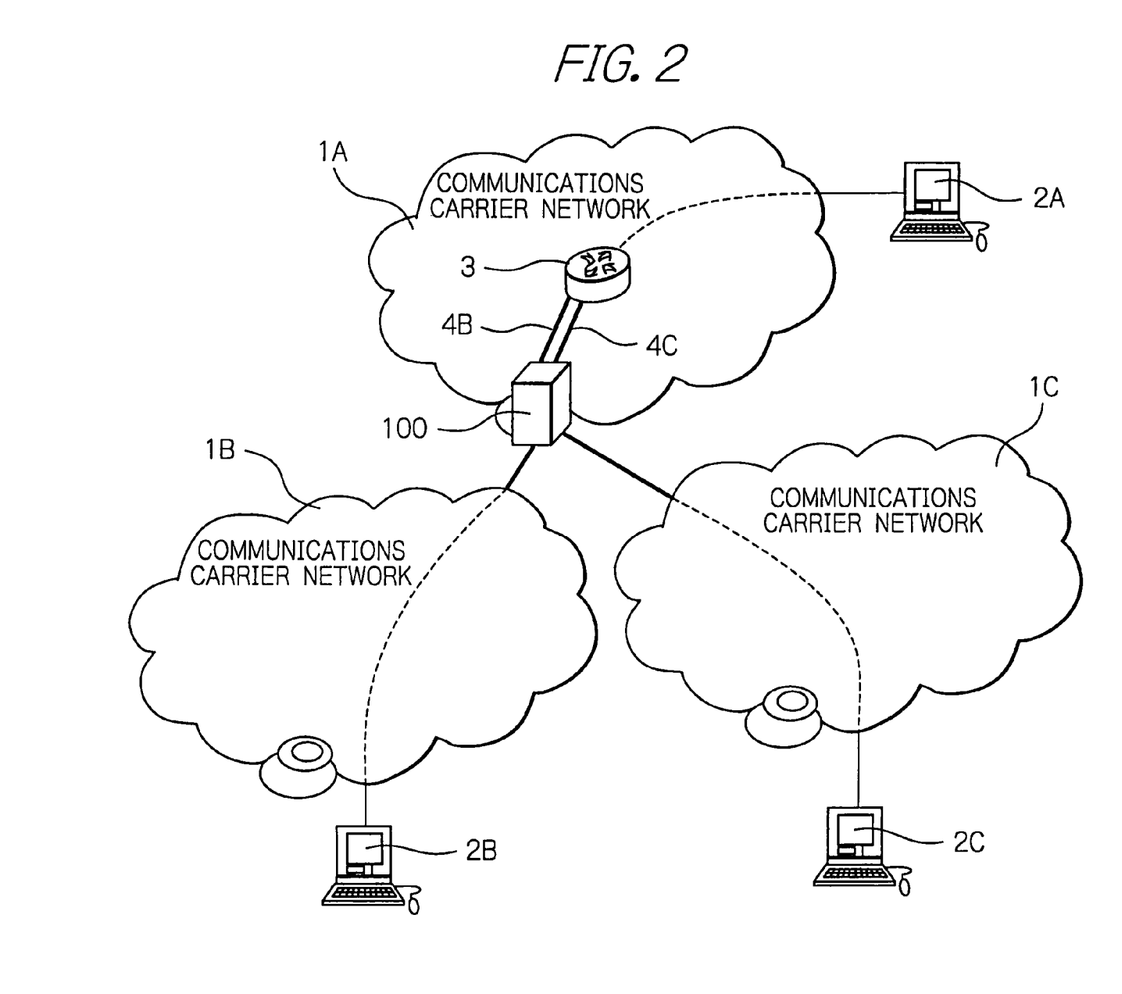
FIG. 2 explanatorily shows the location of the inter-network connection system in accordance with the embodiment shown in FIG. 1.

At first, reference will be made to FIG. 2 which explanatorily shows where the inter-network connection system 100 of the illustrative embodiment is located in a telecommunications network. Today, as shown in the figure, there are plural different networks, e.g. 1A, 1B and 1C, which may be IP (Internet Protocol) networks provided by telecommunications carriers A, B and C serving as operating entities or management agencies on the networks. In the example, the communications carrier network 1A is capable of being connected to the other communications carrier networks 1B and 1C through the inter-network connection system 100 which is located at an end of this communications carrier network 1A, such that a user terminal 2A of the communications carrier network 1A can communicate with user terminals 2B and 2C of the other communications carrier networks 1B and 1C. The network 1A has a general-purpose router 3 between the user terminal 2A and the inter-network connection system 100. The general-purpose router 3 performs the route selection of traffic toward the other communications carrier networks 1B and 1C, and selects an interface to be used in accordance with the route as selected. That is, the general-purpose router 3 carries out the function of selecting routes, which is dispensed with in the inter-network connection system 100.

In this description, the word "traffic" indicates communication traffic in connection with electronic information which is encoded. If different encoding systems are used between the communications carrier networks 1A, 1B and 1C or the user terminals 2A, 2B and 2C, the inter-network connection system 100 has to perform necessary conversion in accordance with the encoding systems of the communications carrier network or user terminal at the designation.

The inter-network connection system 100 and the general-purpose router 3 are connected by a plurality of interfaces corresponding in number to communications carrier networks or communications carriers serving as designations. For example, in the embodiment shown in FIG. 2, the communications carrier network 1A can be connected to the communications carrier networks 1B and 1C, and thereby the inter-network connection system 100 and the general-purpose router 3 are connected by means of an interface 4B provided for connection to the communications carrier network 1B and an interface 4C provided for connection to the communications carrier network 1C.

The general-purpose router 3 possesses information on the respective ports of interface blades or cards 1051 to 1054 (1061 to 1064), which will be described later, as to which port is used for respective one of routes, and which two of the ports constitute a pair of ports. With reference to this information, an appropriate route can be selected.

Figure 3:
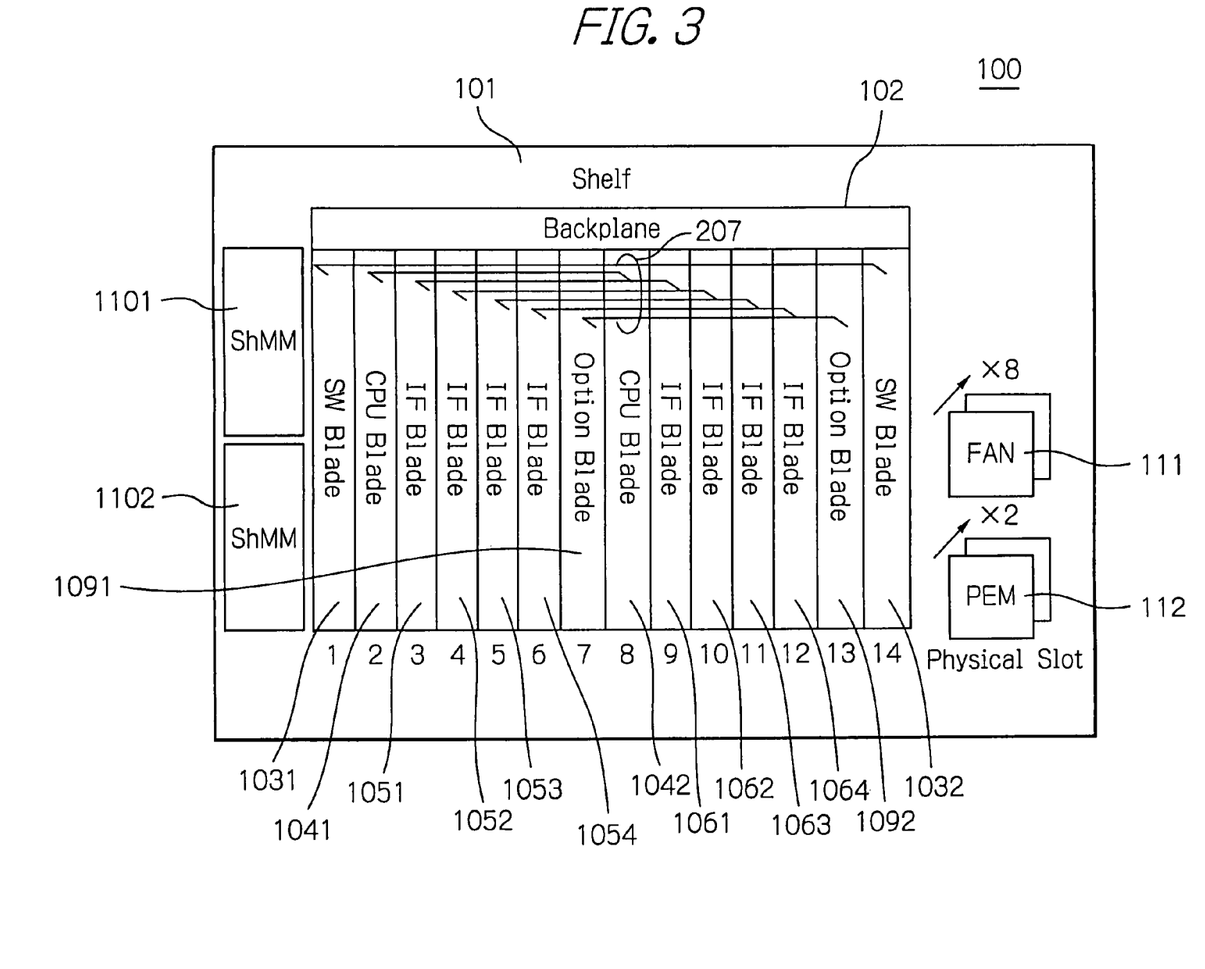
FIG. 3 explanatorily shows an example of an arrangement of functional components in the inter-network connection system in accordance with the illustrative embodiment.
Figure 4:
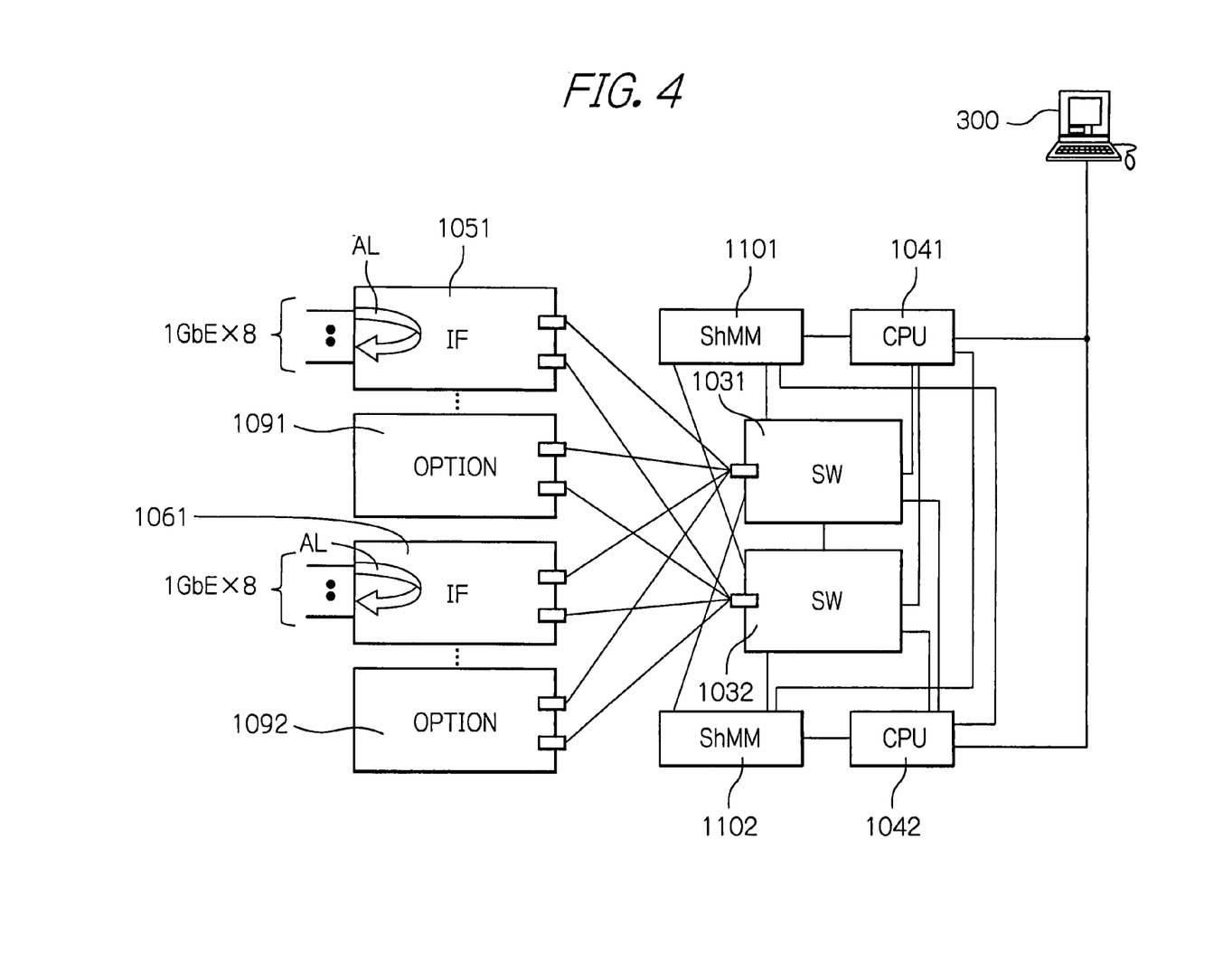
FIG. 4 is a schematic block diagram showing the representative functional components of the inter-network connection system interconnected in accordance with the illustrative embodiment.

FIG. 3 explanatorily shows an example of an arrangement of functional components in the inter-network connection system 100. FIG. 4 is a schematic block diagram showing the connection relationship between the representative functional components of the inter-network connection system 100. The system 100 shown in FIG. 3 may be implemented as a platform provided on the basis of ATCA (Advanced Telecom Computing Architecture). The word "blade" included in the legends shown in FIG. 3 is removed form the functional names shown in FIG. 4. Although not shown in FIGS. 3 and 4, the inter-network connection system 100 is generally provided with a plurality of shelves each of which is configured as illustrated in FIGS. 3 and 4.

The ATCA specifications include the dimensional standard of the shelf, or chassis, 101 and the hardware standard of the blade, or board. The backplane 102 accommodates a plurality of blades for enabling data transfer between different blades therethrough. As shown in FIG. 3, a switch (SW) blade 1031, a central processing unit (CPU) blade 1041, four interface (IF) blades 1051 through 1054, an option blade 1091, a CPU blade 1042, four interface blades 1061 through 1064, an option blade 1092, and a switch blade 1032 are inserted to the backplane 102 respectively in the order from the physical slot numbers 1 through 14 as shown in FIG. 3. On the other hand, the shelf 101 accommodates two shelf managers (ShMM) 1101 and 1102, a plurality of fan units (FAN) 111, and a plurality of power entry modules (PEM) 112. For example, the shelf 101 shown in FIG. 3 has eight FANS and two PEMS.

The switch blades 1031 and 1032, the CPU blades 1041 and 1042, the respective interface blades 1051 to 1054 and 1061 to 1064 and the option blades 1091 and 1092 and the shelf managers 1101 and 1102 are provided in respective pairs, such that one serves as an active one while the other serves as a standby one in order to provide a redundant system. Each blade with similar functions can communicate on an update channel 207 as illustrated in FIG. 3. In the following description, the notation such as switch blades 1031 and 1032 basically means only one of the switch blades which is in the active state goes on processing.

Meanwhile, the ATCA specifies the locations of the slots into which the switch blade 1031, the CPU blade 1041, the CPU blade 1042, and the switchblade 1032 are to be inserted. However, any blade can be inserted into the slots into which, in this example, the other blades 1051 to 1054 and 1061 to 1064 are inserted. In this illustrative embodiment, the respective blades are arranged as shown in FIG. 3 in which five other blades are interposed between one blade and the other blade of each pair configuring a redundant system with an exception of the paired switch blades 1031 and 1032.

The CPU blades 1041 and 1042 serve to control the operation of the entire inter-network connection system 100. In the present embodiment, for example, the CPU blades 1041 and 1042 set the matching information (route information) between the input port and output port of each of the respective interface blades 1051 to 1054 and 1061 to 1064 for traffic control.

The CPU blades 1041 and 1042 perform such an operation for setting routing configuration. The switch blades 1031 and 1032 serve to control traffic transfer between a plurality of blades over the backplane 102. In other words, the switchblades 1031 and 1032 function as an inter-board connection board operable to intervene in information transfer, for example, between active one of the interface blades 1051 to 1054 and 1061 to 1064 and the option blade 1091 or 1092.

In this specification, "layer X", where X is a natural number, denotes the layer X of the OSI (Open System Interconnection) reference model of the ISO (International Organization for Standardization). The seven layers of the OSI reference model is divided here into two categories: upper layers (layers 7, 6 and 5 in this example) and lower layers (layers 4, 3, 2 and 1 in this example). While the upper layers deal with processes close to the application, the lower layers are close to the physical network medium.

The interface blades 1051 to 1054 and 1061 to 1064 serve to perform, for example, conversion processes of various types of information on the basis of information on the lower layers. For example, these interface blades 1051 to 1054 and 1061 to 1064 manage own port numbers, make a distinction between TCP (Transmission Control Protocol) and UDP (User Datagram Protocol), perform address/port conversion, perform Internet Protocol version 4/6 (V4/V6) conversion, and so forth.

The option blades 1091 and 1092 serve to perform operation in the upper layers, such as a coder-decoder (Codec), an application level gateway (ALG), which cannot be performed in the interface blades 1051 to 1054 and 1061 to 1064.

The backplane 102 serves as wiring and connection between all the blades 1031 to 1091 and 1032 to 1092 in order to do with information transfer between the different blades as described above. The shelf managers 1101 and 1102 serve to manage information on blade installation, for example, as to what type of blade is inserted to each of the slots which are not reserved for connection to predetermined blades, the information indicative of which blade of each pair in redundant configuration is active while the other blade is standing by, and other necessary information.

In FIG. 4, while the illustration of the connection lines on the backplane 102 is dispensed with, only the connection relationship between the main functional elements is illustrated. The interface blades 1051 to 1054 and 1061 to 1064 and the option blades 1091 and 1092 are connected to the pair of switch blades 1031 and 1032, respectively. In FIG. 4, on behalf of all the interface blades, only the interface blades 1051 and 1061 are shown. The pair of switch blades 1031 and 1032 are also connected to each other. The pair of switch blades 1031 and 1032 are controlled by the CPU blades 1041 and 1042, and connected to the shelf managers 1101 and 1102 in order to obtain information about the arrangement of the interface blades 1051 to 1054 and 1061 to 1064 and the option blades 1091 and 1092 and the operation state, i.e. the active or standby state of each blade.

The CPU blades 1041 and 1042 are also connected to the shelf managers 1101 and 1102, respectively, and takes control of the switchblade 1031 or 1032 with reference to the information about the arrangement of the interface blades 1051 to 1054 or 1061 to 1064 and the option blade 1091 or 1092 and the operation state, i.e. the active or standby state of each blade. The CPU blades 1041 and 1042 are connected to an element management system (EMS) 300, for example, for controlling the interface blades.

The interface blades 1051 to 1054 and 1061 to 1064 can perform processes, such as traffic processing, therein on the lower layers such as address/port conversion, V4/V6 conversion and so forth, and thereby it is not necessary to communicate with the option blade 1091 or 1092 and the CPU blade 1041 or 1042 on the backplane 102 and the switch blade 1031 or 1032.

In the instant embodiment, the traffic processing such as address/port conversion, V4/V6 conversion, and so forth on the lower layers is thus performed within the interface blades 1051 to 1054 or 1061 to 1064 as depicted by the return arrow AL in FIG. 4. That is a feature that data transfer for the traffic processing on the backplane 102 is no longer needed.

Figure 1:
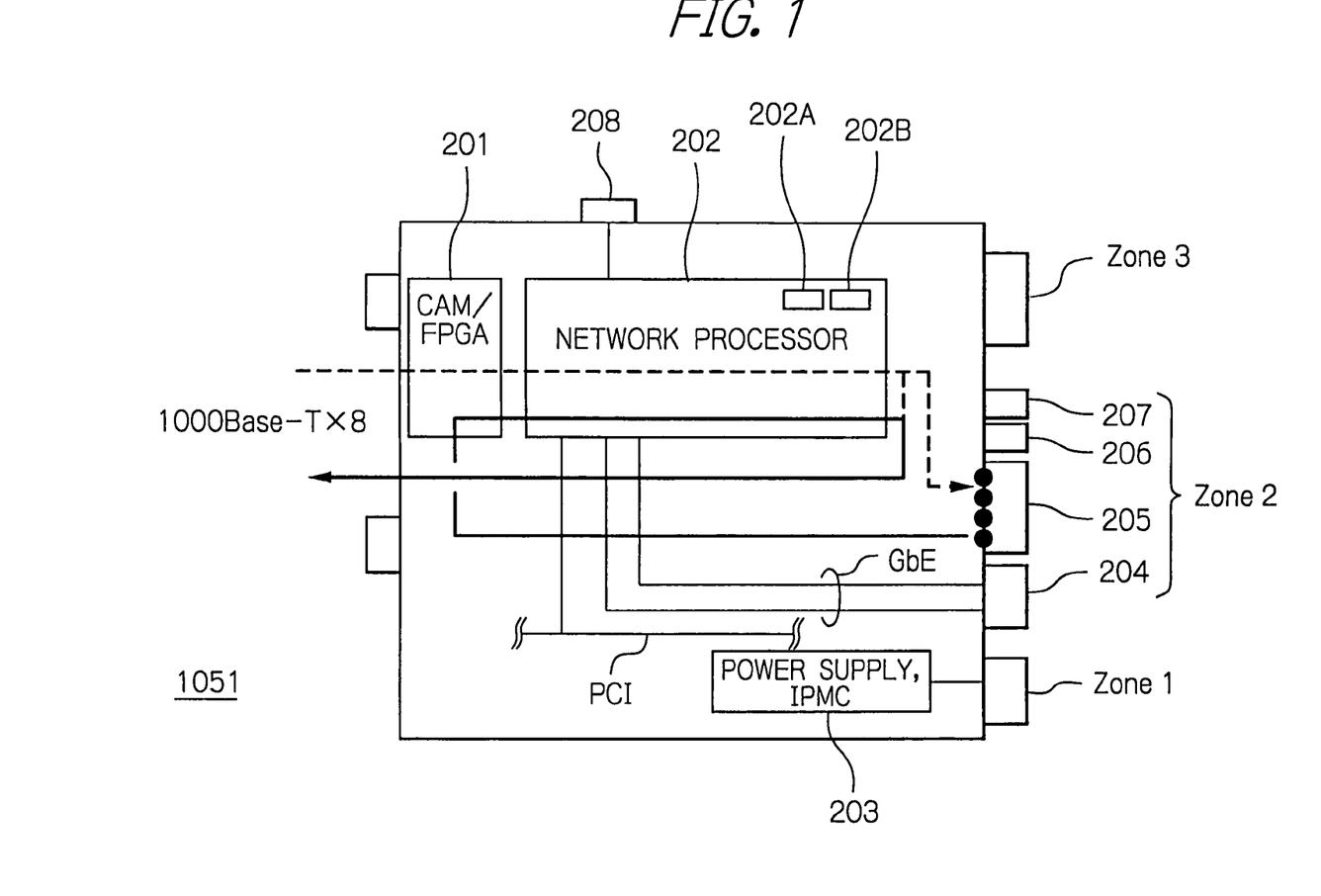
FIG. 1 is a schematic block diagram showing the functional configuration of an interface blade used in an inter-network connection system in accordance with an illustrative embodiment of the present invention.

Each of the interface blades 1051 to 1054 and 1061 to 1064 is provided with a plurality of (e.g. eight) ports interconnected to signal lines in conformity with 1 Gigabit Ethernet (trademark) standard (1 GbE) implemented as 1000 Base-T in the embodiment shown in FIG. 1. The half (inner side) of the ports are connected to the general-purpose router 3 in the communications carrier network in question, for example, the communications carrier network 1A, the other half (outer side) of the ports are connected to the other communications carrier networks, for example, the communications carrier networks 1B and 1C. The transfer of information is performed, without intervention of the backplane 102, on the traffic from the general-purpose router 3 directly to the other communications carrier network, or vise versa. In this case, each inner side port of either of the interface blades 1051 to 1054 and 1061 to 1064 is paired with one of the outer side ports of the same blade respectively to form a port group such that traffic is passed from one inner side port of a port group to the corresponding outer side port of this port group and vice versa.

Now, FIG. 1 is a schematic block diagram showing the functional configuration of the interface blade 1051 which is specifically designed for the inter-network connection system 100. As a matter of course, the interface blades 1052 to 1054 and 1061 to 1064 may be similar in structure to the blade 1051. Thus, the functional configuration of the interface blade 1051 described below may be applied to the remaining interface blades.

The interface blade 1051 has its left end, in FIG. 1, serving as a front face for providing a plurality of (e.g. eight) ports, and its right end serving as a rear face to be connected to the back plane 102. The rear face has input/output terminals that are in conformity in interface with ATCA (Advanced Telecom Computing Architecture).

The interface blade 1051 includes a CAM/FPGA (Content Addressable Memory/Field Programmable Gate Array) unit 201, a network processor 202, a power supply IPMC (Intelligent Platform Management Controller) unit 203 and so forth, which are interconnected as illustrated.

The CAM/FPGA unit 201 serves as a mechanism for processing header information, i.e. for distinguishing and rewriting traffic such as high-speed packets. For example, the CAM/FPGA unit 201 determines which session, or call, the traffic carries, and performs information conversion in accordance with the settings.

The network processor 202 is a so-called NPU (Network Processing Unit) which serves to perform filtering, bandwidth control, marking packets, an address/port conversion, and necessary traffic processing in the lower layers on the basis of header information of the lower layers.

The network processor 202 saves port group information 202A about two ports (port group) of each pair of the interface blades 1051, receives traffic through one port of each pair, and outputs the incoming traffic through the other port on the basis of the port group information 202A.

The port group information 202A is given to the CPU blade 1041 or 1042 from a maintenance terminal over an exclusive or leased line or a public network. The CPU blade 1041 or 1042 transfers the information 202A to the corresponding interface blade 1051 over the backplane 102. The network processor 202 of the interface blade 1051 stores the information 202A in a predetermined area of its built-in memory. As noted in the figure, the dotted arrow indicates an input signal path while the solid arrows indicate output signal paths.

The network processor 202 saves information 202B of a session through which the current traffic is transmitted, and determines in accordance with the session information 202B whether the current traffic can be processed only in the lower layers or has to be processed also in the upper layers. If the current traffic has to be processed additionally in the upper layers, the network processor 202 transfers the traffic to the option blade 1091 or 1092 through the backplane 102 and the switch blade 1031 or 1032, and makes the option blade 1091 or 1092 perform the necessary process in the upper layers. The traffic as processed is returned through the switch blade 1031 or 1032 and the backplane 102.

It is noted that after the processes in the upper layers part or all of the processes in the lower layers may be performed and conversely before the processes in the upper layers part or all of the processes in the lower layers may be performed.

In the case where it is not needed to perform the processes by the option blade 1091 or 1092, the network processor 202 handles the traffic within the interface blade 1051 by receiving the traffic over an input signal path and outputting the traffic over the corresponding output signal path only after the processes in the lower layers within the interface blade 1051.

The session information 202B is what is set by the CPU blade 1041 or 1042. Needless to say, the information transfer necessary for this setting is performed over the backplane 102. When a session is established, as known in the art, various matching procedures and determination of the method for absorbing differences are performed in order that user terminals can communicate by negotiation making use of signaling process. For example, a common encoding scheme, or the type of codec, between both ends of a communication is first selected. If such a common encoding scheme cannot be selected, it is then determined that the inter-network connection system 100 intervenes between both ends of the communication and performs codec conversion for the purpose of absorbing the difference so far as the codec conversion function of the inter-network connection system 100 can be used for this purpose. Because of this, a signaling signal during establishing a session is passed through the CPU blade 1041 or 1042, which can thereby determine and recognize the various types of conversion for processing a session, and create the session information 202B to be given to the interface blade 1051. The session information 202B thus formed as described above is given to the interface blade 1051 on the backplane 102, and saved by the network processor 202.

Alternative to the network processor 202, an appropriate general-purpose CPU may be used. However, the use of the network processor 202 has the following advantage as compared with the use of a general-purpose CPU. That is, in the case where the network processor 202 is used, it is possible to avoid a possible delay, which would occur if a general-purpose CPU is used, originating from the overhead needed because of the bottleneck in data transfer due to the restriction of the interface, and the overhead needed for calling operating system kernel services during running software. For example, the advantages of the use of the network processor 202 in place of a general-purpose CPU are described in Kei Kato et al., "High-Speed Address Hiding Function for Next Generation Networks", Oki Technical Review, Issue 210, Vol. 74, No. 2, pp. 28-31, April 2007.

It is noted that the input/output terminals of the rear face of the interface blade 1051 are divided into three sections; Zone 1 providing a power connector and so forth, Zone 2 providing a base interface connector 204, a fabric connector 205, an update channel connector 206 and a synchronous clock interface 207, and Zone 3 providing user defined connectors, in conformity with ATCA. In Zone 2, the transfer of signaling signals between the interface blade 1051 and the backplane 102 is performed on the base interface 204, and the traffic transfer between the interface blade 1051 and the backplane 102 is performed through the fabric interface 205. Further, communication between a pair of interface blades 1051 providing the redundant system is performed on the update channel 206, and the transfer of synchronous timing information is performed through the synchronous clock interface 207.

The notation "GbE" in FIG. 1 given to lines in the interface blade 1051 indicates signaling lines. The notation "PCI" in the figure indicates a general-purpose interface bus such as PCI (Peripheral Component Interconnect) bus in the interface blade 1051. The transfer of information within the interface blade 1051 may be performed through the general-purpose interface bus. In addition to this, the interface blade 1051 is provided with a serial interface 208 having a Dsub-9 (D-subminiature-9) connector in conformity with RS232C (Recommended Standard 232 Version C). Furthermore, the power supply IPMC unit 203 is implemented with a single-chip CPU serving as a controller which is adapted to communicate with the shelf manager 1101 or 1102 in accordance with ATCA.

In what follows, the operation of the interface blade 1051 in the inter-network connection system 100 will be described.

The port group information is transferred to a predetermined area of the built-in memory in the interface blade 1051 through the CPU blade 1041 or 1042 in order to set the configuration of the interface blade 1051 as to which inner side port and which outer side port are to be paired as a port group.

After setting the port groups, when receiving traffic through the inner side port of each port group, the interface blade 1051 always outputs the traffic through the corresponding outer side port of each port group except for traffic to be discarded, and conversely when receiving traffic through the outer side port of each port group, the interface blade 1051 always outputs the traffic through the corresponding inner side port of each port group except for traffic to be discarded.

While the interface blade 1051 in the inter-network connection system 100 is not provided with route selection function, the general-purpose router 3 is responsible for this function.

By referring to session information stored when establishing the session with reference to the identification information obtained by the CAM/FPGA unit 201 during interface processing in the interface blade 1051, when it is determined that codec conversion, an ALG process or the like is needed for handling traffic, the traffic is transferred from the interface blade 1051 to the option blade 1091 or 1092 through the backplane 102 and the switch blade 1031 or 1032, processed by the option blade 1091 or 1092, returned to the interface blade 1051 again through the backplane 102 and the switch blade 1031 or 1032. The traffic which is returned is processed again by the CAM/FPGA unit 201 and the network processor 202, and output on the output port.

In accordance with the above embodiment, there are advantages as follows. It is possible to process a large amount of traffic exceeding the processing capacity of the backplane by parallel processing of the network processor in the interface blade and the like measure in order to increase the processing capacity. For example, in the case where one interface blade is capable of processing data at 30 gigabit per second (Gbps), an inter-network connection system having ten interface blades in a non-redundant configuration is capable of processing data at a maximum of 300 Gbps when the traffic can be processed in the lower layers. Since the inter-network connection system 100 of the above embodiment forms a redundant system, the processing capacity is about a half of the above capacity.

In addition to this, when receiving traffic through one inner side port, the interface blade 1051 always outputs the traffic through the corresponding outer side port except for traffic to be discarded, and conversely when receiving traffic through one outer side port, the interface blade 1051 always outputs the traffic through the corresponding inner side port except for traffic to be discarded. Thereby, since traffic shall not be passed between different port groups, it is possible to enhance the security of the system.

In the above embodiment, the interface blade deals with processes in the layers 4, 3, 2 and 1 of the OSI reference model which are referred to herein as the lower layers while the option blade deals with processes in the layers 7, 6 and 5 which are referred to herein as the upper layers. However, the boundary between the lower and upper layers can be changed. Also, the boundary between the lower and upper layers can be set to a middle position in a layer such as the layer 4 or 5. For example, it is possible to perform the process of rewriting the header of the transport layer such as TCP/UDP by the option blade, while the interface blade is responsible for performing the processes in the layer 4 except this header rewriting process.

Furthermore, in the above embodiment, the present invention is applied to the inter-network connection system between telecommunications carrier networks. However, the present invention is not specifically limited thereto, but it is possible to apply the present invention to a case where only one end of a connection is a communications carrier network, and a case where neither end of a connection is a communications carrier network.

The entire disclosure of Japanese patent application No. 2007-221165 filed on Aug. 28, 2007, including the specification, claims, accompanying drawings and abstract of the disclosure is incorporated herein reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An inter-network connection system to be located between a first communications network to which said system belongs and a second communications network, for connecting the first and second communications networks to each other, said system comprising:
    an interface board having a plurality of input/output ports, each input/output port being configured to receive/output traffic for processing the traffic in a lower layer;
    an upper layer processing board configured to process traffic in an upper layer; and
    an inter-board connection board intervening in information transfer between said interface board and said upper layer processing board,
    said interface board comprising:
        a port group information storage configured to store information on a plurality of port groups, each port group being formed by a pair of a first input/output port and a second input/output port among the plurality of input/output ports, so that the plurality of port groups define a one-to-one mapping between the first input/output port and the second input/output port, the first input/output port being configured to input/output traffic from/to the first communications network, the second input/output port being configured to input/output traffic from/to the second communications network;
        a session information storage configured to store information about a session which is established;
        a lower layer processor configured to process traffic in the lower layer and store information on a port group in said port group information storage;
        a route setter configured to set a route of particular traffic, which is to be processed only in the lower layer or to be additionally processed in the upper layer, so that, when the particular traffic is input through one of the pair of the input/output ports of a particular port group, the particular traffic, after being processed at least in the lower layer processor, is output through the other of the pair of the input/output ports of the particular port group according to information stored in said port group information storage; and
        a process determiner configured to reference session identification information of inputted traffic and session information stored in said session information storage to determine whether the inputted traffic is to be processed only in the lower layer or to be additionally processed in the upper layer so as to cause, when the inputted traffic is to be processed in the upper layer, the traffic to be transferred to said upper layer processing board.

2. The system as claimed in claim 1, wherein the first communications network and the second communications network are communications carrier networks.

3. The system as claimed in claim 1, wherein said upper layer processing board processes traffic in a layer greater than layer 4 of Open Systems Interconnection (OSI) reference model, and said lower layer processor processes the traffic in a layer lower than or equal to the layer 4 of the OSI reference model.

4. The system as claimed in claim 1, wherein said upper layer processing board processes traffic in a layer greater than or equal to layer 4 of Open Systems Interconnection (OSI) reference model, and said lower layer processor processes the traffic in a layer lower than the layer 4 of the OSI reference model.

5. The system as claimed in claim 1, wherein said upper layer processing board processes traffic in a layer greater than or equal to layer 4 of Open Systems Interconnection (OSI) reference model, and said lower layer processor processes the traffic in a layer lower than or equal to the layer 4 of the OSI reference model.

6. The system as claimed in claim 1, further comprising a further interface board, wherein
    said further interface board and said interface board are provided in a pair such that the two interface boards have the same structure and functions as each other, and
    one of the two interface boards is configured to serve as an active interface board while the other of the two interface boards is configured to serve as a redundant interface board.

7. The system as claimed in claim 1, further comprising a further upper layer processing board, wherein
    said further upper layer processing board and said upper layer processing board are provided in a pair such that the two upper layer processing boards have the same structure and functions as each other, and
    one of the two upper layer processing boards is configured to serve as an active upper layer processing board while the other of the two upper layer processing boards is configured to serve as a redundant upper layer processing board.

8. The system as claimed in claim 1, further comprising a further inter-board connection board, wherein
    said further inter-board connection board and said inter-board connection board are provided in a pair such that the two inter-board connection boards have the same structure and functions as each other, and
    one of the two inter-board connection boards is configured to serve as an active inter-board connection board while the other of the two inter-board connection boards is configured to serve as a redundant inter-board connection board.

9. An interface board included in an inter-network connection system to be located between a first communications network to which the system belongs and a second communications network, for connecting the first and second communications networks to each other, the inter-network connection system including an upper layer processing board configured to process traffic in an upper layer and an inter-board connection board intervening in information transfer between said interface board and the upper layer processing board, said interface board comprising:

a plurality of input/output ports, each input/output port being configured to receive/output traffic for processing traffic in a lower layer;

a port group information storage configured to store information on a plurality of port groups, each port group being formed by a pair of a first input/output port and a second input/output port among the plurality of input/output ports, so that the plurality of port groups define a one-to-one mapping between the first input/output port and the second input/output port, the first input/output port being configured to input/output traffic from/to the first communications network, the second input/output port being configured to input/output traffic from/to the second communications network;

a session information storage configured to store information about a session which is established;

a lower layer processor configured to process traffic in the lower layer and store information on a port group in said port group information storage;

a route setter configured to set a route of particular traffic, which is to be processed only in the lower layer or to be additionally processed in the upper layer, so that, when the particular traffic, after being processed at least in the lower layer processor, is input through one of the pair of the input/output ports of a particular port group, the particular traffic is output through the other of the pair of the input/output ports of the particular port group according to information stored in said port group information storage; and a process determiner configured to reference session identification information of inputted traffic and session information stored in said session information storage to determine whether the inputted traffic is to be processed only in the lower layer or to be additionally processed in the upper layer so as to cause, when the inputted traffic is to be processed in the upper layer, the inputted traffic to be transferred in the upper layer.

10. A method of processing traffic in an inter-network connection system located between a first communications network to which the system belongs and a second communications network, for connecting the first and second communications networks to each other, the inter-network connection system including an interface board having a plurality of input/output ports, each input/output port being configured to receive/output traffic for processing the traffic in a lower layer, an upper layer processing board configured to process traffic in an upper layer, and an inter-board connection board intervening in information transfer between the interface board and the upper layer processing board, the interface board further including a port group information storage, a session information storage, a lower layer processor, a route setter and a process determiner, said method comprising the steps of:

storing in the port group information storage information on a plurality of port groups, each port group being formed by a pair of a first input/output port and a second input/output port among the plurality of input/output ports, so that the plurality of port groups define a one-to-one mapping between the first input/output port and the second input/output port, the first input/output port being configured to input/output traffic from/to the first communications network, the second input/output port being configured to input/output traffic from/to the second communications network;

storing information about a session which is established in the session information storage;

setting a route of particular traffic by the route setter so that, when particular traffic which is to be processed only in the lower layer or to be additionally processed in the upper layer, is input through one of the pair of the input/output ports of a particular port group, the particular traffic, after being processed at least in the lower layer processor, is output through the other of the pair of the input/output ports of the particular port group according to information stored in said port group information storage; and referencing by the process determiner, session identification information of inputted traffic and session information stored in the session information storage to determine whether the inputted traffic is to be processed only in the lower layer or to be additionally processed in the upper layer so as to cause, when the inputted traffic is to be processed in the upper layer, the inputted traffic to be transferred to the upper layer processing board for processing the inputted traffic in the upper layer and, to cause, when the inputted traffic may not be processed in the upper layer, the inputted traffic to be transferred to the lower layer processor for processing the inputted traffic in the lower layer.

* * * * *